Nov. 15, 1932.  W. S. WALKER  1,888,150
GAS STRAINER
Filed Nov. 15, 1930
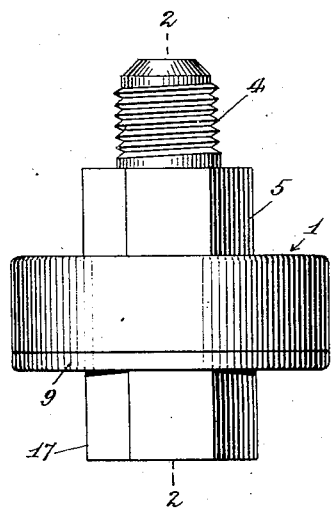
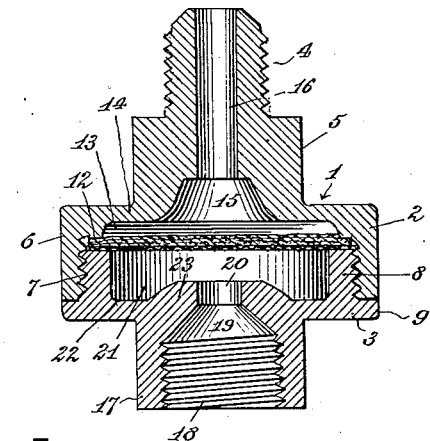
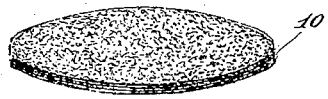
WITNESSES
INVENTOR
Woods S. Walker
BY
ATTORNEYS Patented Nov. 15, 1932

1,888,150

UNITED STATES PATENT OFFICE

WOODS S. WALKER, OF NEW YORK, N. Y., ASSIGNOR TO THE CONSOLIDATED GAS COMPANY OF NEW YORK, OF NEW YORK, N. Y., A CORPORATION OF NEW YORK

GAS STRAINER

Application filed November 15, 1930. Serial No, 495,992.

This invention relates to gas strainers and has for an object to provide an improved construction wherein the ordinary house gas in common use may be strained without reducing the pressure in the gas line.

Another object of the invention is to provide an improved assembled construction which is made of few parts and with connections whereby it may be used with gas refrigerators or other gas-using appliances wherein small gas openings are utilized.

A further object, more specifically, is to provide a gas strainer wherein combined felt and wire mesh straining elements are used and arranged to cause a thorough straining while permitting a full volume of gas to pass.

In the accompanying drawing—

Figure 1 is a side view of a strainer disclosing an embodiment of the invention;

Figure 2 is a sectional view through Figure 1 approximately on the line 2—2;

Figure 3 is a perspective view of one of the straining elements shown in Figure 2;

Figure 4 is a perspective view of the second straining element shown in Figure 2.

Referring to the accompanying drawing by numerals, 1 indicates the casing as a whole, said casing being divided into what may be termed a body 2 and a clamping section 3. These terms are only used for the purpose of description as the part 3 might be termed a body if desired. The body 2 is provided with a threaded portion 4 whereby it may be connected to a pipe or other device using gas, said portion 4 being integral with the enlarged portion 5, preferably formed hexagonal so that a wrench may be used thereon for applying or removing the device. The hexagonal part 5 merges into an annular flange 6 having internal threads 7.

By reason of the flange 6 there is provided a chamber into which a clamping flange 8 of the clamping section extends, said clamping flange being externally threaded. The clamping section 3 is provided with a radially extending flange 9 which may or may not contact with flange 6. Preferably when the parts are in operating position, flange 9 is spaced slightly from flange 6 whereby clamping flange 8 tightly presses the peripheral portion of the filter elements 10 and 11 against the annular seat 12.

The seat 12 is machined or otherwise formed to present a substantially even surface, although this is not absolutely necessary, as the filter element 10 is some desirable kind of felt, although suitable cotton or cloth pads might be substituted if desired. The filtering element 11 is preferably a comparatively fine wire mesh member of substantially the same diameter as the element 10, whereby the clamping flange 8 can tightly pinch the peripheral part of the respective filter elements against the annular seat 12 and thereby make a gas-tight joint. By reason of this fact, flange 9 is preferably positioned so as not to tightly contact with flange 6 and, if desired, the outer edge of the flanges 9 and 6 may be left unmachined.

Chamber 13 formed by flange 6 and the connecting section 14, as well as portion 5, acts as a reception chamber for the gas as it passes through the filter elements. From this chamber the gas passes into a tapering chamber 15, and from thence into a bore 16 extending through the members 4 and 5. The clamping section 3 is provided with a member 17 hexagonal on the outside for receiving a wrench. The inside is provided with a threaded portion 18 for receiving a pipe or other article. The threaded portion 18 merges into a tapering section 19, and eventually into a restricted opening 20, which opening is preferably the same size as the bore 16. Opening 20 discharges into a chamber 21 whereby a large surface is provided for the gas and, consequently, the gas may, in a certain sense, seep or percolate slowly through the respective filtering elements and be readily discharged into the chamber 13.

This may take place and yet the same volume of gas will pass through bore 16 as is passing through the opening 20. It will be evident that if the filtering elements were only of the diameter of the opening 20, the gas would be greatly retarded and there would be much less pressure of gas passing out of the filters to that passing in, but by reason of the large surface of filtering elements exposed the volume and pressure are not interrupted.

The wire mesh filter 11 acts in the double capacity of a filter for holding back comparatively large objects and also as a support and stiffener for the felt filtering element 10. The felt filtering element 10 naturally filters out substantially all foreign matter, including fine drops of oil, water and the like, whereby the gas passing through the bore 16 is free from these impurities and will flow readily through a very fine orifice in a small burner of a gas refrigerator, or the fine orifice in any other device using gas.

In gas refrigerators and similar devices the burners are usually very small, and the openings in the burners extra small, but it is necessary to have a constant flow of gas and necessary for the careful operation of the refrigerator or other device to feel reasonably sure of constant operation.

The device may be mounted to operate in any plane but preferably it is arranged in a vertical plane so that foreign matter trapped in the chamber 21 will fall to the floor 22, which is an annular depression resulting from the fact that there is a projecting section 23 extending into the chamber 21.

The section 3 may be unscrewed at any time and the foreign matter removed. Also, if desired, new filter elements may be supplied from time to time without disconnecting the filter from the device using gas.

I claim—

A filter including a two-piece housing having an inlet member and an outlet member, said inlet member having a threaded tubular pipe-receiving portion merging into a radiating plate having a centrally positioned apertured boss, and an upstanding threaded annular flange, said outlet member having a tubular threaded pipe-receiving portion merging into a radiating plate having an upstanding annular seat, and an upstanding threaded flange adapted to be screwed on to the flange on said inlet member, and a filtering member positioned with its perimeter resting on said seat and pressed against said seat by the upstanding flange on said inlet member, said flange, plate and apertured boss of said inlet member defining an entrance chamber having a depressed annular refuse-receiving compartment.

WOODS S. WALKER.